Aug. 5, 1969    E. F. MITCHELL, JR    3,459,158
PENDANT TOY FOR ANIMALS
Filed Feb. 9, 1967
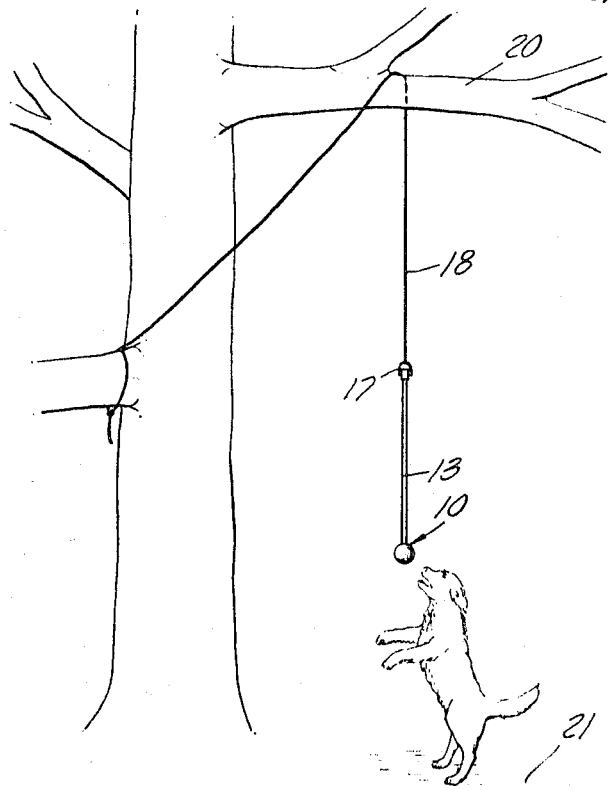
FIG. 1.
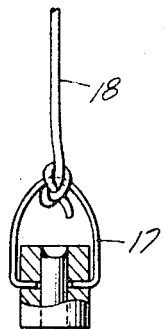
FIG. 2.
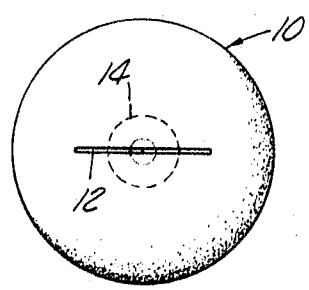
FIG. 3.
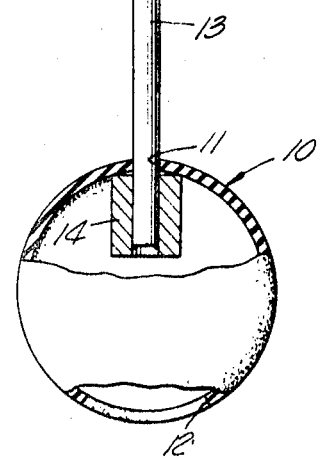
EARL F. MITCHELL, JR.
INVENTOR.
BY  Lyon & Lyon
ATTORNEYS

3,459,158
PENDANT TOY FOR ANIMALS
Earl F. Mitchell, Jr., 2420 Hyperion Ave.,
Los Angeles, Calif. 90027
Filed Feb. 9, 1967, Ser. No. 614,948
Int. Cl. A01k *15/00*
U.S. Cl. 119—29                                        4 Claims

ABSTRACT OF THE DISCLOSURE

A ball or other object of a size to be grasped by the teeth of a dog, cat or other animal is attached to the lower end of a rod, and the upper end of the rod is pendantly supported by a flexible line. When the ball and rod are thus pendantly supported above the ground at a suitable height, the animal may jump into the air to grab the ball in its teeth, and the rod prevents accidental winding of the flexible line around the animal's head or throat.

BACKGROUND OF THE INVENTION

This invention relates to toys for exercise and amusement of animals, particularly dogs or cats. A device of this type may be classified as an amusement device.

SUMMARY

Briefly stated, this invention concerns a pendant toy for animals, the toy comprising a ball or other object of a size to be grasped by the teeth of an animal, a rod secured at one end to the object and at the other end to a flexible pendant line.

BRIEF DESCRIPTION OF THE DRAWINGS

FIGURE 1 is a side elevation showing a preferred embodiment of the invention.

FIGURE 2 is an enlarged side elevation partly in section.

FIGURE 3 is a bottom plan view.

DESCRIPTION OF THE PREFERRED EMBODIMENT

Referring to the drawings, the ball generally designated 10 may comprise an ordinary tennis ball having an opening 11 and an aligned slot 12 formed therein. The ball is fixed to the lower end of a rod 13, and as shown in the drawings this rod extends into the interior of the ball 10 through the opening 12. The rod is much longer than the diameter of the ball. The lower portion of the rod 13 is fixed within a collar 14 contained within the ball. The collar is initially inserted into the hollow ball by temporarily deforming the slot 12. The upper end of the rod 13 is provided with a swivel bail 17 and a flexible line 18 is secured thereto. The flexible line 18 is longer than the length of the rod 13.

In use, the upper end of the flexible line is attached to a suitable support, such as for example the branch 20 of a tree. The line is adjusted so that the ball 10 is positioned at the proper height above the ground 21 to permit an animal to jump for the ball and attempt to hold it in its teeth. Experience has shown that animals will play with such a device for considerable periods of time, and that this provides good exercise. It is important to observe that the presence of the rod 13 prevents the animal from becoming entangled in the flexible line 18. If it were not for the presence of the rod 13, the line 18 might wrap around the animal's head or around its throat, to hold the animal suspended in the air, with possible disastrous consequences.

While a ball 10 has been shown at the lower end of the rod 13, it is possible to employ other objects than a ball in this position, for example an artificial bone. Although a ball is preferred, any durable object which will attract an animal and which can be grasped in its teeth can be used.

I claim:

1. An animal exerciser and amusement device of the class described, the combination of: an object having at least one dimension of a size to be grasped by the teeth of a dog, cat or other animal, a rigid rod having a length greater than the maximum dimension of the object, means securing the object to one end of the rod, and a flexible line secured to the other end of the rod, whereby said object and rod may be pendantly supported by means of the flexible line.

2. The combination set forth in claim 1 in which the object comprises a ball.

3. The combination set forth in claim 1 in which the line is longer than the rod.

4. The combination set forth in claim 1 in which the object comprises a hollow ball, and the securing means located within the ball.

References Cited

UNITED STATES PATENTS

| | | | |
|---|---|---|---|
| 439,297 | 10/1890 | Heyder | 273—67 |
| 1,898,817 | 2/1933 | Dole | 273—58 |
| 2,096,078 | 10/1937 | Windson | 119—29 |
| 2,194,736 | 3/1940 | De Bruler | 119—29 X |
| 2,267,519 | 12/1941 | Dickson et al. | 273—58 |
| 2,307,905 | 1/1943 | Ament | 119—29 |
| 2,698,598 | 1/1955 | Hadley | 119—29 |
| 2,795,209 | 6/1957 | Lewis | 119—63 |
| 3,114,546 | 12/1963 | Verseghy | 273—58 X |
| 3,295,499 | 1/1967 | Manchester | 119—29 |

FOREIGN PATENTS 655,781    1/1963    Canada.

ALDRICH F. MEDBERY, Primary Examiner

U.S. Cl. X.R.

119—1; 273—58